United States Patent
Hayamizu et al.

[11] 3,918,438
[45] Nov. 11, 1975

[54] ENDOSCOPE CAPABLE OF CHANGING OVER THE DIRECTIONS OF VISUAL FIELD

[75] Inventors: Yoshisada Hayamizu; Katsuyuki Kanehira, both of Hochioji, Japan

[73] Assignee: Olympus Optical Co., Ltd., Tokyo, Japan

[22] Filed: Apr. 11, 1974

[21] Appl. No.: 460,214

[30] Foreign Application Priority Data
Apr. 16, 1973 Japan.................................. 48-42820

[52] U.S. Cl. ........................ 128/4; 350/25; 350/301
[51] Int. Cl.² ........................................... A61B 1/00
[58] Field of Search .................................. 128/4-9; 32/69; 350/301, 34, 24, 25, 26

[56] References Cited
UNITED STATES PATENTS

| | | |
|---|---|---|
| 2,987,960 | 6/1961 | Sheldon .............................. 350/24 |
| 3,140,339 | 7/1964 | Nisperly et al....................... 350/301 |
| 3,651,735 | 7/1970 | Hiruma................................. 350/34 |

*Primary Examiner*—Richard A. Gaudet
*Assistant Examiner*—Henry S. Layton
*Attorney, Agent, or Firm*—Waters, Schwartz & Nissen

[57] ABSTRACT

An endoscope capable of changing over the directions of visual field is disclosed which comprises first and second reflecting mirrors arranged in front of an objective lens with their reflecting surfaces opposed and inclined with each other. Either one or both of the first and second reflecting mirrors are made movable so as to selectively effect one of direct sight, lateral sight and rear sight visualizations while observing the interior of a hollow organ or objects not present to the eye.

5 Claims, 5 Drawing Figures

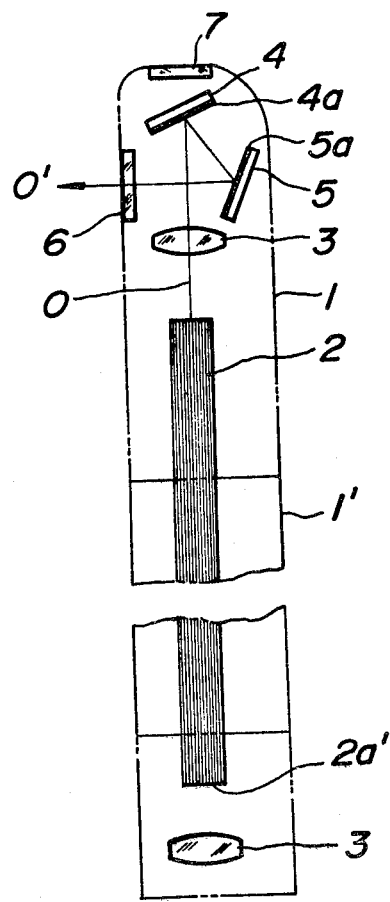
FIG_1A

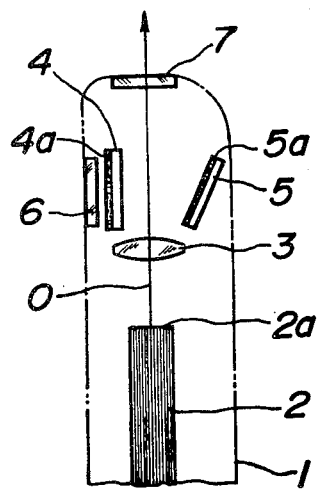
FIG_1B
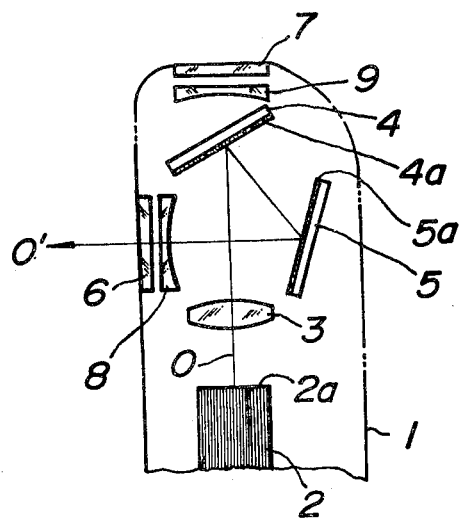
FIG_2

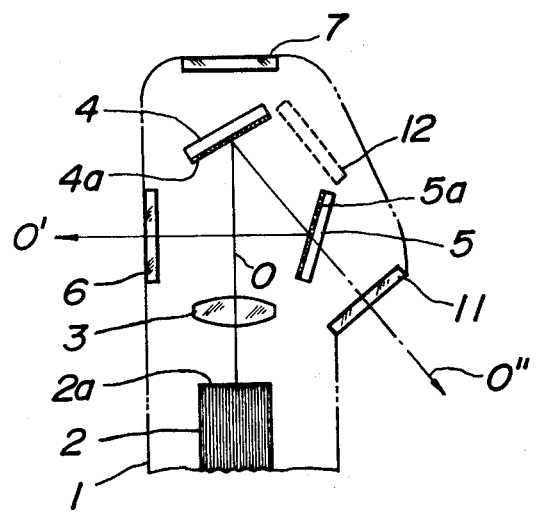
FIG_3
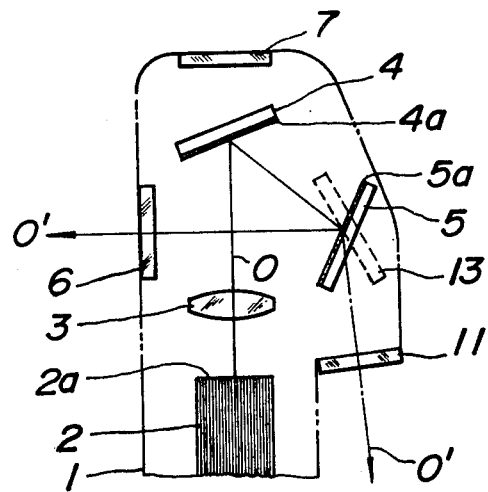
FIG_4

ENDOSCOPE CAPABLE OF CHANGING OVER THE DIRECTIONS OF VISUAL FIELD

This invention relates to endoscopes such as fiberscopes, hard endoscopes and the like for visualizing the interior of a hollow organ or objects and forming visual images of the organ or objects not present to the eye and more particularly to an endoscope capable of changing over the directions of visual field one from the other.

Such fisualization of the endoscope consists of a direct sight visualization for observing objects opposed to a front end cover glass window provided for the front end rigid part of the flexible part of the endoscope without deflecting the optical axis of an objective lens arranged in the front end rigid part of the flexible part of the endoscope and a lateral sight visualization for observing objects opposed to a lateral side cover glass window provided for the front end part of the flexible part of the endoscope by deflecting the optical axis of the objective lens.

These direct and lateral sight visualizations have respective advantageous features. But, it is desirous to provide an endoscope which can change-over the direct sight visualization to the lateral sight visualization and vice versa while observing the objects. For this purpose, it has heretofore been proposed to provide one reflecting mirror in front of the objective lens arranged in the front end rigid part of the flexible part of the endoscope. This reflecting mirror is adapted to be removed from the optical axis of the objective lens in case of effecting the direct sight visualization and inserted onto the optical axis of the objective lens in case of effecting the lateral sight visualization.

The use of such construction permits the direct sight visualization to observe a non-inverted image, but provides the disadvantage that the lateral sight visualization results in an observation of an image with its left and right sides inverted. That is, the change-over of the directions of visual field causes an inversion of the left and right sides of the images from each other and there is a risk of the left and right sides of the images being confused when the directions of visual field are changed over one from the other.

In order to obviate such disadvantage, the reflecting mirror arranged in front of the objective lens has been replaced by a pentagonal dachprism adapted to be inserted into and removed from the front space of the objective lens, thereby making the images observed by both the direct and lateral sight visualizations non-inverted ones.

The use of such prism, however, requires a large space in the front end rigid part of the flexible part of the endoscope in which the prism is located when it is removed from the optical axis of the objective lens. As a result, the front end part of the endoscope becomes large in size.

An endoscope whose front end rigid part of the flexible part is changeable in direction has also been proposed. This endoscope can reflect its front end rigid part so as to observe an object located in the rear thereof. But, if an endoscope whose front end rigid part cannot be changed in direction such, for example, is hard endoscopes is used to be inserted a tubular space whose inner diameter is relatively small, it is impossible to deflect the front end rigid part of the flexible part of the endoscope and hence to observe objects located in the rear of the endoscope.

An object of the invention is to provide an endoscope which is simple in construction and capable of changing over the direct sight visualization to the lateral sight visualization and vice versa without inverting the sides of images to be observed.

Another object of the invention is to provide an endoscope whose front end rigid part is compact in construction and which can change the picture angle of the field of view and magnification of the image.

A further object of the invention is to provide an endoscope which can observe objects located in the rear of the endoscope without deflecting the front end rigid part of the endoscope.

A feature of the invention is the provision of an endoscope capable of changing over the directions of visual field comprising a flexible part provided at its front and rear ends with rigid parts, respectively, said front end rigid part being provided at its front end and lateral side with direct sight and lateral sight cover glass windows, respectively, an optical fiber bundle enclosed in said flexible part and having front and rear end surfaces terminated in said front and rear end rigid parts, respectively, an objective lens arranged in said front end rigid part, eyepiece arranged in said rear end rigid part, first and second reflecting mirrors arranged in front of said objective lens with their reflecting surfaces opposed and inclined with each other, said first reflecting mirror being adapted to be inserted into and removed from the optical axis of said objective lens.

Another feature of the invention is the provision of the above described endoscope in which said front end rigid part is provided at its rear side with a rear sight cover glass window and said second reflecting mirror is adapted to be inserted into and removed from a rear sight optical axis passing through said rear sight cover glass window in a direction perpendicular thereto.

The invention will now be described in greater detail with reference to the accompanying drawings, wherein:

FIG. 1A shows an embodiment of the endoscope according to the invention for effecting a lateral sight visualization, part of a flexible part of the endoscope being broken away;

FIG. 1B shows the same view as FIG. 1A for effecting a direct sight visualization, a front end rigid part only being shown;

FIG. 2 shows another embodiment of the endoscope according to the invention for effecting a lateral sight visualization, a front end rigid part only of the endoscope being shown;

FIG. 3 shows a further embodiment of the endoscope according to the invention for effecting a rear sight visualization, a front end rigid part only of the endoscope being shown; and FIG. 4 shows a still further embodiment of the endoscope according to the invention for effecting a rear sight visualization, a front end rigid part only of the endoscope being shown.

Referring to FIG. 1A showing an embodiment of the endoscope for effecting lateral sight visualization and forming images of objects not present to the eye, reference numeral 1 designates a front end rigid part of the endoscope according to the invention, 1' its flexible part, 2 an optical fiber bundle of an optical image transfer device, 2a its front end surface, 2a' its rear end surface, 3 an objective lens arranged in front of the front end surface 2a, 3' an eye-piece arranged in the rear of the rear end surface 2a' of the optical fiber bundle 2.

In accordance with invention, a first reflecting mirror 4 and a second reflecting mirror 5 are arranged in front of the objective lens 3. The first reflecting mirror 4 is movably located on the optical axis 0 of the objective lens 3 and has its reflecting surface 4a opposed to and inclined from the front end surface 2a of the optical fiber bundle 2. The second reflecting mirror 5 is fixedly located on a lateral sight axis 0' passing through a lateral side cover glass window 6 and provided at the lateral side of the front end rigid part 1 has its reflecting surface 5a opposed to and inclined from the reflecting surface 4a of the first reflecting mirror 4.

The first and second reflecting mirrors 4 and 5 serve to deflect the optical axis 0 of the objective lens 3 by 90°.

Reference numeral 7 designates a front end cover glass window provided at the front end of the front end rigid part 1 of the flexible part 1' of the endoscope.

The lateral sight visualization, will be effected as follows.

Light emitted from an object to be observed and opposed to the lateral side cover glass window 6 is incident through the window 6 into the front end part 1 of the endoscope and reflected by the reflecting surface 5a of the second reflecting mirror 5 and then reflected by the reflecting surface 4a of the first reflecting mirror 4 in succession. The thus reflected light passes through the objective lens 3 by which an optical image is formed on the front end surface 2a of the optical fiber bundle 2 through which the optical image is transferred to the rear end surface 2a' and can be observed by the eyepiece 3'.

In case of effecting the direct sight visualization, the first reflecting mirror 4 is removed from the optical axis 0 of the objective lens 3 as shown in FIG. 1B.

In this case, light emitted from an object to be observed and opposed to the front end cover glass window 7 is incident through the window 7 into the front end part of the endoscope and directly incident upon the objective lens 3 by which an optical image is formed on the front end surface 2a of the optical fiber bundle 2.

The first reflecting mirror 4 may be removed out of the optical axis 0 of the objective lens 3 by rotating it about its one end or by slidably moving it to such a position that it does not hinder the direct sight visualization.

The endoscope constructed and arranged as described above is capable of changing over the direct sight visualization to the lateral sight visualization and vice versa in a positive and simple manner. In addition, the left and right sides of the image formed by both the lateral and direct sight visualizations are not inverted from each other. Moreover, the front end rigid part 1 of the flexible part 1' of the endoscope can be made compact in construction.

In case of removing the first reflecting mirror 4 out of the optical axis 0 of the objective lens 3, if the first reflecting mirror 4 is brought into a position where the first reflecting mirror 4 is in parallel with the lateral sight cover glass window 6 as shown in FIG. 1B, the first reflecting mirror 4 can prevent undesirous light passing the window 6 from penetrating into the front end rigid part 1 of the endoscope, and as a result, the direct sight visualization can be effected with a relatively high degree of luminosity.

In FIG. 2 is shown another embodiment of the endoscope according to the invention, in which like reference numerals denote like parts shown in FIG. 1A. In the present embodiment, provision is made of auxiliary lenses 8 and 9 arranged in the front end rigid part 1 of the flexible part 1' of the endoscope near the windows 6 and 7 in parallel therewith, respectively. These auxiliary lenses 8 and 9 are capable of varying the picture angle of the field of view and magnification of the image formed at the end surface 2a of the optical fiber bundle 2.

In FIG. 3 is shown a further embodiment of the endoscope according to the invention which can effect a rear sight visualization of forming an image of objects not present to the eye. In the present embodiment, a cover glass window 11 for use in the rear sight visualization is added to the constitutional elements shown in FIG. 1A.

In case of effecting the rear sight visualization by the endoscope shown in FIG. 3, the first reflecting mirror 4 is remained as it is on the optical axis 0 of the objective lens 3 and the second reflecting mirror 5 is moved to a position 12 shown by dotted lines where the second reflecting mirror 5 is located out of the rear sight optical axis 0''.

The rear sight visualization will be effected as follows. Light emitted from an object located in the rear of the window 11 is incident through the window 11 into the front end part 1 of the endoscope and reflected by the reflecting surface 4a of the first reflecting mirror 4. The thus reflected light passes through the objective lens 3 by which an optical image is formed on the end surface 2a of the optical fiber bundle 2. In the present embodiment, the light emitted from the object is reflected by the first reflecting mirror 4 one time only, so that the image formed on the end surface 2a of the optical fiber bundle 2 has its left and right sides inverted from each other.

In FIG. 4 is shown another embodiment which can effect rear sight visualization without inverting the left and right sides of the image. In the present embodiment, the first reflecting mirror 4 is remained at it is and the second reflecting mirror 5 is moved to a position 13 shown by dotted lines where the second reflecting mirror 5 is located in the rear sight optical axis 0'' but is inclined therefrom by an acute angle and opposed to the reflecting surface 4a of the first reflecting mirror 4.

Light emitted from an object located in the rear of the window 11 is incident through the window 11 into the front end part of the endoscope and reflected by the reflecting surface 5a of the second reflecting mirror 5 and then reflected by the reflecting surface 4a of the first reflecting mirror 4 in succession. The light thus reflected two times passes through the objective lens 3 by which an optical image is formed on the end surface 2a of the optical fiber bundle 2.

In the present embodiment, the light emitted from the object located in the rear of the window 11 is reflected by the first and second reflecting mirrors 4 and 5 two times, so that a non-inverted image is formed on the end surface 2a of the optical fiber bundle 2.

In the embodiments shown in FIGS. 3 and 4, provision may be made of an auxiliary lens (not shown) arranged near the rear sight cover glass window 11 and in parallel therewith in the similar manner as the embodiment shown in FIG. 2. Such auxiliary lens is capable of varying the picture angle of the field of view and magnification of the image formed on the end surface 2a of the optical fiber bundle 2.

In the embodiments described above with reference to FIGS. 1 to 4, either one of the first and second reflecting mirrors provided for one endoscope is made movable so as to change-over one of the two visual directions to another visual direction and vice versa.

Alternatively, both the first and second reflecting mirrors provided for one endoscope may be made movable so as to change-over any selected one of three visual directions to either one of the other two visual directions, and vice versa.

As explained hereinbefore, the invention provides an endoscope which is simple in construction and is capable of changing over its visual directions to any selected one of three visual directions and further provides the important advantage that a non-inverted image can always be formed by direct, lateral or rear sight visualization, that the front end rigid part as a whole of the endoscope can be made compact in construction, that it is possible to prevent undesirous surplus light from penetrating into the front end rigid part of the endoscope, and that the picture angle of the field of view and magnification of the optical image can adequately be varied.

In addition, the endoscope according to invention can visualize objects not present to the eye in various directions without deflecting the front end rigid part when it is inserted into a tubular space whose inner diameter is relatively small.

Even when the invention were applied to a hard endoscope which could not deflect its front end part, the use of the measures described provides the important advantage that a wide range of fields of view can be visualized by moving the reflecting mirrors in a simple manner.

In the above described embodiments, the lateral sight optical axis 0' is made perpendicular to the optical axis 0 of the objective lens 3. The angle between these two optical axes 0' and 0, however, may be changed dependent on the arrangement of the first and second reflecting mirrors. Thus, the invention may also be applied to an endoscope whose lateral sight optical axis 0' is inclined from the optical axis 0 of the objective lens 3 by any selected angle so as to change-over the direct sight visualization to the lateral sight visualization and vice versa.

What is claimed is:
1. An endoscope capable of changing over the directions of visual field comprising a flexible part provided at its front and rear ends with rigid parts, respectively, said front end rigid part being provided at its front end and lateral side with direct sight and lateral sight cover glass windows, respectively, an optical fiber bundle enclosed in said flexible part and having front and rear end surfaces terminated in said front and rear end rigid parts, respectively, an objective lens arranged in said front end rigid part, an eyepiece arranged in said rear end rigid part, first and second reflecting mirrors arranged in front of said objective lens with their reflecting surfaces opposed and inclined with each other, said first reflecting mirror being (adapted to be) selectively inserted into and removed from the optical axis of said objective lens, and said first and second mirrors being selectively movable so as to cooperate and provide a visual field through said lateral side.

2. An endoscope capable of changing over the directions of visual field as claimed in claim 1 and further comprising an auxiliary lens arranged in said front end rigid part of the endoscope near each of said direct and lateral sight cover glass windows and in parallel therewith, whereby the picture angle of the field of view and magnification of the image formed at the front end surface of the optical fiber bundle are varied.

3. An endoscope capable of changing over the directions of visual field as claimed in claim 1, wherein said front end rigid part is provided at its rear side with a rear sight cover glass window and said second reflecting mirror is selectively inserted into and removed from a rear sight optical axis passing through said rear sight cover glass window in a direction perpendicular thereto.

4. An endoscope capable of changing over the directions of visual field, as claimed in claim 3 wherein both said first and second reflecting mirrors are selectively inserted into and removed from the optical axis of said objective lens and rear sight optical axis, respectively.

5. An endoscope capable of changing over the directions of visual field as claimed in claim 3, wherein said second reflecting mirror is adapted to be inclined from the rear sight optical axis by an acute angle so as to make its reflecting surface opposed to the reflecting surface of said first reflecting mirror.

* * * * *